The present invention relates to plastic materials and more particularly to plastic materials having insulating surfaces.

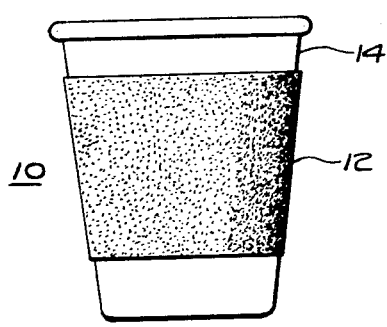
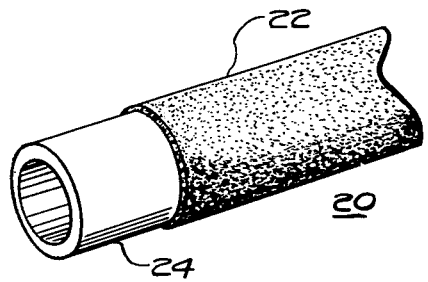
FIG. I
FIG. II
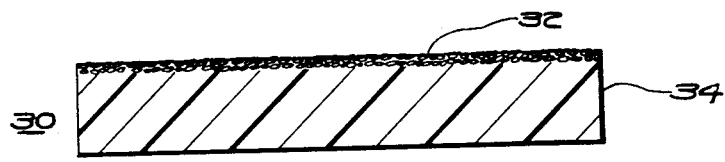
FIG. III
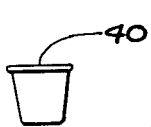 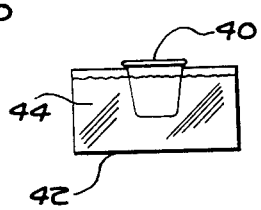 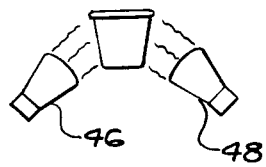 
(a)  (b)  (c)  (d)
FIG. IV
DAVID A. RUSSELL
EDGAR E. HARDY
INVENTOR
BY James C. Logrmaini
ATTORNEY 3,262,625
INSULATING SURFACES
David A. Russell, Springfield, and Edgar E. Hardy, Longmeadow, Mass., assignors to Monsanto Company, a corporation of Delaware
Filed Apr. 12, 1963, Ser. No. 272,540
15 Claims. (Cl. 229—1.5)

It is well known in the art that plastic foams can be made by incorporating a blowing agent or liberating gas material into a thermoplastic resin and subsequently raising the temperature of the resin. This causes the blowing agent to form or expand a gas thereby expanding the resin to produce cellular structures. The foamed resin which is produced is of much lighter density than the original resin and generally possesses greatly increased sound dampening and heat insulating properties.

In spite of the advantages gained by foaming plastic resins, the use of these foamed materials has been limited for many purposes because of the comparatively poor structural strengths of the final fabricated articles. To minimize this problem, various methods for supporting the foamed resin have been devised most of which involve adhering or bonding solid and/or rigid members to the foam. However, these structures are generally difficult and expensive to construct and are sometimes limited in their application depending on the effectiveness of the bonding operation.

It has now been found that thermoplastic articles which substantially combine the insulating characteristics of foamed resin and the structural stability and strength of non-foamed plastic can be fabricated by a straightforward and relatively inexpensive process hitherto unappreciated or considered.

Accordingly, it is a principal object of the present invention to provide plastic articles having an improved combination of insulating and structural characteristics.

Other objects of the present invention will in part be obvious and will in part appear hereinafter.

These and other objects are attained by shaping a solid plastic form, steeping the plastic form in a medium absorbable by the plastic for a predetermined interval of time, removing the plastic form from the medium and finally heating the plastic form to produce a foamed covering at the area of contact with the absorbable medium which extends partially into the solid plastic form.

The following drawings are provided for the purpose of illustrating the present invention.

FIG. I is a side view of a container having a portion of its outer surface in a foamed state.

FIG. II is a perspective view, partly in section of a conduit having an outer surface in its foamed state.

FIG. III is a side view of a panel having its upper surface in a foamed state.

FIG. IV is a diagrammatical view illustrating the operational steps for producing the articles shown in FIGS. I–III.

Referring to the drawings in detail, various products are illustrated which can be formed by utilizing the process described herein. More specifically, FIG. I illustrates a cup 10 having a foamed outer surface 12. The remainder 14 of the cup is solid or in nonfoamed state. FIG. II illustrates a conduit 20 also having a foamed covering 22 and a nonfoamed portion 24 while FIG. III illustrates a panel 30 having a foamed covering 32 on one side of the panel with the rest of the body 34 of the panel being nonfoamed. FIG. IV illustrates a process by which the products described in FIGS. I–III may be produced. More specifically, a cup 40 is immersed in a tank 42 containing a medium 44 which is absorbable by the plastic for a predetermined interval of time. At the end of this interval of time, the cup 40 is withdrawn from tank 42 and subjected to a heat source such as the infrared lamps 46 and 48 shown in Step (c) set forth in FIG. IV. The heating results in the formation of a foam covering at the area which was previously in contact with the medium such as shown in Step (d), i.e., the cup 40 now has a foam covering 50 at the area which was exposed to the medium and subsequently heated.

The above description and particularly the drawings are set forth for the purpose of illustration only and not for the purpose of limitation.

The following examples are given to illustrate the invention and are not intended as limitations thereof. Unless otherwise specified, quantities are mentioned on a weight basis.

*Example I*

Styrene homopolymer having a Staudinger molecular weight of approximately 55,000 is injection molded in the form of a smooth, tapered cup which is approximately four inches in height with an average inside cup diameter of two and one-quarter inches.

The cup formed by the above-described operation is steeped by immersing the lower or bottom portion of the cup into a solvent composed of Freon (trichlorofluoromethane) up to within one-half inch of its top peripheral edge and maintaining the cup in this immersed condition for a period of ten seconds after which the cup is withdrawn from the solvent. After a twenty second interval at dry room temperature conditions, the cup is immersed in a heated water bath maintained at 80° C. for a period of ten seconds.

The resulting cup has a foamed outer surface throughout the area of solvent immersion extending into the body of the cup approximately a third of its overall thickness. Examination of the cup discloses that the overall structural properties of the cup are not seriously altered by the steeping operation while at the same time the insulating properties of the cup are increased several fold.

*Example II*

The procedure of Example I is repeated except that (1) a rubber-modified styrene polymer blend having a Staudinger molecular weight of approximately 50,000, i.e., a physical blend of 7.5 parts of styrene-butadiene graft copolymer with 92.5 parts of styrene polymer wherein the graft copolymer contains 28% by weight of styrene based on the weight of the copolymer, is used in place of the styrene homopolymer and (2) the cup is immersed in the Freon for a period of five seconds instead of ten seconds. As in Example I, the insulating properties of the cup are increased several fold.

*Example III*

A rubber-modified styrene blend which is the same as that used in Example II is extruded in the form of a sheet 26 mils thick.

A portion of the sheet is then heated to approximately 270° F. and vacuum molded in the form of a cup similar in dimension to the cup formed in Example I.

The cup formed by the above-described operation is steeped by immersing the lower or bottom portion of the cup into a solvent composed of Freon (trichlorofluoromethane) up to within one-half inch of its top peripheral edge and maintaining the cup in this immersed condition for a period of five seconds after which the cup is withdrawn from the solvent. After a twenty second interval at dry room temperature conditions, the cup is immersed in a heated water bath maintained at 80° C. for a period of ten seconds.

The resulting cup has a foamed outer surface throughout the area of solvent immersion extending into the body of the cup approximately a third of its overall thtickness. Examination of the cup discloses that the overall structural properties of the cup are not seriously altered by the steeping operation while at the same time the insulating properties of the cup are increased several fold.

*Example IV*

Polyvinyl chloride homopolymer having a Staudinger molecular weight of approximately 50,000 is continuously extruded in the form of 1 and 1½" O.D., ¼ inch thick pipe. While the pipe is being extruded, forced air drafts serve to reduce the temperature of the pipe, at least at the outer surface thereof, to room temperature. Support rollers for the continually advancing pipe are arranged to (1) drape or immerse the pipe into a steeping tank containing methylene chloride such that each portion of the pipe is immersed for a period of 300 seconds at 80° C., (2) expose the pipe to atmospheric room temperature conditions for a period of ten seconds and (3) immerse the pipe in a heated water bath such that each portion of the pipe is immersed for a period of about ten seconds. After the piping emerges from the water bath, it is cut into various lengths as desired.

The resulting pipe has a foamed outer surface extending approximately ⅛" into the body of the pipe. Examination of the piping discloses that the overall structural properties of the pipe have not been seriously altered by the steeping operation while at the same time the insulating properties of the cup have increased several fold. In addition, it is found that pipe sweating which occurs when cold fluids are conducted through pipes situated in humid atmospheres is substantially reduced.

*Example V*

An acrylonitrile-butadiene-styrene copolymer (acrylonitrile=30%; butadiene=10%) is extruded in the form of sheeting ¼" thick. This sheet as it advances is cooled substantially to room temperature and directed into a steeping tank containing methyl ethyl ketone by means of support rollers. The length of the steeping tank is such to permit immersion of the traveling sheet for a period of 15 seconds before the sheet is directed out of the steeping tank. The sheeting is allowed to air dry as it further advances for a period of approximately 30 seconds after which the top surface of the sheeting is passed directly under three banks of infrared heaters positioned transversely to the sheet. Foaming of the top surface of the sheeting occurs as a result of the heating operation. After the sheeting has passed the heaters, it is cut into various lengths as desired depending upon their ultimate use.

The resulting sheet has one of its sides foamed which extends approximately one-third within the total thickness of the final sheet. Tests run on the sheeting disclose that overall sheet strength is not seriously altered by the steeping operation while at the same time the insulating properties of the sheeting have increased several fold.

In general, the plastics used in the practice of this invention are substantially thermoplastic materials which have been fabricated into various shapes and include such materials as polystyrene, styrene-butadiene-acrylonitrile graft and/or mechanical polyblends, other rubber modified graft and mechanically blended styrene polymers, vinyl chloride-vinyl acetate copolymers, polyethylene, chlorosulfonated polyethylene, chlorinated polyethylene and ethyene-vinyl acetate copolymers which are graft and/or mechanically blended with polyvinyl chloride homopolymers and copolymers, polyvinyl halide homopolymers and copolymers including interpolymers, mixtures and plasticized versions of same.

The medium absorbable by the plastic in the practice of this invention is comprised of either solvents or a mixture of solvents and non-solvents. The terminology "solvent" as used in this specification is intended to mean volatile materials which are fairly readily absorbable by the plastics which are treated in the practice of this invention. Other liquid or gaseous materials which are not readily absorbable by the plastics being treated are considered to be "non-solvents." It is sometimes advantageous to utilize mixtures of solvents and non-solvents as the steeping medium since the non-solvent will tend to slow the rate of absorption of the steeping solution resulting at times in improved insulating properties by its effect on cell size and density. Of course, certain volatile materials may according to this definition be considered solvents for certain plastics and as non-solvents for other plastics.

The choice of the solvents used in the practice of this invention will depend primarily on the type of thermoplastic material which is to be steeped, e.g., acetone or methyl ethyl ketone are suitable for the acrylonitrile-butadiene-styrene copolymers while Freon (trichlorofluoromethane) is not. On the other hand, Freon is considered quite suitable for polystyrene homopolymers and rubber modified interpolymers. Among the solvents which find application in the present process there may be listed Freon (trichlorofluoromethane), methylene chloride, acetone, dichloroethylene, xylene, carbontetrachloride, methyl ethyl ketone, benzol, toluol, chloroform and the like. Among the materials which find utility as non-solvents, there may be included methanol, ethanol, n-pentane, isopentane, hexane, diethylethene and the like.

The conditions under which the steeping operations are conducted are considered critical although these conditions will vary depending on the particular plastics and solvents being utilized. In general, the plastic article is fabricated to substantially its final shape before the article is heated or foamed since any further working on the surface of the article will tend to distort the foamed portion. However, it is possible to combine the heating or foaming operation with the fabricating or molding operation. For example, a plastic sheet could be steeped in a solvent mixture after which the sheet is subjected to a cup molding operation. The heat input serves to both mold and foam the cup. However, molding temperatures and pressures will have an effect on cell size and care is generally required to avoid distorting the cell structures of the molded plastic. Normally, the steeping operation is carried out after the plastic article has been cooled to substantially room temperature. However, the steeping operation can be conducted while the plastic article is at elevated temperatures which, in effect, tends to increase the rate of solvent absorption. When this is done, the foaming operation may be a little more difficult to control with respect to surface uniformity although good results can be obtained with careful operation. In general, the steeping operation will only require a few seconds depending for the most part on the depth of foam desired, the type of solvent used, and the respective temperatures of the solvent and plastic article. The steeping operation may be carried out by immersion of the plastic article in a liquid solvent as set forth in the examples or the plastic article may be subjected to solvent vapors in a vessel which may or may not be pressurized.

In general, the plastic article is permitted to dry for short interval of time prior to heating or foaming. This drying interval allows deeper diffusion and serves to harden the outer surface of the cup somewhat forming a skin which aids considerably in the formation of the closed cell structures which are necessary for good insulating properties. If desired, the drying interval may be accelerated by forced air blasts, moderate heating conditions, etc.

After the drying interval, the plastic article is heated to foam the outermost portions of the plastic article. The heating means utilized may vary, the final results being affected by the uniformity of heating, rate of heating and temperature level at which it is conducted. In the case of biaxially oriented plastics, it is sometimes necessary to support or fix the sheet dimensionally to avoid the loss of orientation during the processing operation.

The products of this invention are formed from substantially thermoplastic materials. The structures which may be fabricated in the practice of this invention are exceptionally useful for applications requiring high insulating characteristics and good structural properties. In addition, these structures find application in areas where sweating (atmospheric condensation) of fluid holding or supporting structures are a problem. Typical applications also include the manufacture of cups and other containers designed to hold hot or cold substances, piping, paneling, wire covering and numerous other structures wherein this unique combination of properties is necessary or desired.

It is obvious that many variations may be made in the products and processes set forth above without departing from the spirit and scope of this invention.

What is claimed is:

1. A plastic article of manufacture having an improved combination of insulating and structural characteristics, said plastic article having at least one wall with substantially parallel opposing surfaces, said wall being composed throughout of a substantially thermoplastic material which comprises a foamed polymer portion extending from within the body of said thermoplastic material to one of said opposing surfaces and a non-expandable polymer portion integrally connected to said foamed polymer portion.

2. The plastic article of manufacture according to claim 1 wherein the thermoplastic material comprises a polymer composition containing at least 50% by weight of polymerized styrene.

3. The structure of claim 1 wherein the article of manufacture is a container.

4. The structure of claim 1 wherein the article of manufacture is a conduit.

5. The structure of claim 1 wherein the article of manufacture is a conduit having the foamed polymer portion extending to the outer surface.

6. A method for producing a foamed surface for insulating purposes on thermoplastic articles which comprises the steps of (1) shaping a solid plastic form (2) steeping the plastic form in a medium absorbable by the plastic until medium is absorbed partly through the plastic (3) removing the plastic form from said medium and (4) heating the plastic form to produce a foamed covering at the area heated and which was in contact with said medium.

7. The method according to claim 6 wherein the medium absorbable by the plastic is trichlorofluoromethane.

8. The method according to claim 6 wherein the medium absorbable by the plastic is a mixture of a solvent and a non-solvent for the plastic.

9. The method according to claim 6 wherein the solid plastic form is a container.

10. The method according to claim 6 wherein the solid plastic form is a cup.

11. The method according to claim 6 wherein the solid plastic form is a conduit.

12. The method according to claim 6 wherein the solid plastic form is an insulating panel.

13. A method for producing a foamed surface on thermoplastic articles which comprises the steps of (1) shaping a solid plastic form (2) steeping the plastic form in a medium absorbable by the plastic until medium is absorbed partly through the plastic (3) removing the plastic form from said medium (4) reshaping the solid plastic form and (5) heating the reshaped plastic form to produce a foamed covering at the area heated which have been in contact with said medium.

14. The method according to claim 13 wherein step (1) comprises shaping a solid plastic sheet.

15. The method according to claim 14 wherein step (5) comprises reshaping the solid plastic sheet in the form of a container.

References Cited by the Examiner

UNITED STATES PATENTS

| 2,744,291 | 5/1956 | Stastny et al. | 264—53 |
| 2,816,852 | 12/1957 | Banks | 161—160 |
| 3,042,972 | 7/1962 | Lafferty | 264—53 |
| 3,126,139 | 3/1964 | Schlechter | 264—45 XR |
| 3,144,493 | 8/1964 | Santelli | 264—51 |

FOREIGN PATENTS 1,180,049   6/1959   France.

OTHER REFERENCES

Stastny, Fritz: "Styropor—New Porous Synthetic," Translation of BASF reprint from Kunststoffe, 44 (1954), No. 4, pp. 173–180, and No. 5, pp. 221–226, see pp. 5–6 of translation.

ALEXANDER H. BRODMERKEL, *Primary Examiner.*

P. E. ANDERSON, *Assistant Examiner.*

UNITED STATES PATENT OFFICE
CERTIFICATE OF CORRECTION

Patent No. 3,262,625                                July 26, 1966

David A. Russell et al.

It is hereby certified that error appears in the above numbered patent requiring correction and that the said Letters Patent should read as corrected below.

Column 6, line 28, for "(5)" read -- (4) --.

Signed and sealed this 24th day of October 1967.

(SEAL)
Attest:

Edward M. Fletcher, Jr.                          EDWARD J. BRENNER
Attesting Officer                                  Commissioner of Patents